United States Patent [19]

Sasaki et al.

[11] Patent Number: 4,807,056
[45] Date of Patent: Feb. 21, 1989

[54] METHOD AND APPARATUS FOR VIDEO SIGNAL RECORDING AND PLAYBACK SIGNAL LEVEL COMPENSATION BASED ON RECORDED REFERENCE SIGNAL

[75] Inventors: Seishi Sasaki, Kobe; Mitsuo Chiba, Osaka; Tatsushi Bannai, Osaka; Shigeru Awamoto, Osaka, all of Japan

[73] Assignee: Matsushita Electric Industrial Co., Ltd., Japan

[21] Appl. No.: 33,469

[22] Filed: Apr. 2, 1987

[30] Foreign Application Priority Data

Apr. 3, 1986 [JP] Japan .................................. 61-77116

[51] Int. Cl.⁴ ......................... H04N 9/491; G11B 5/45
[52] U.S. Cl. ........................................ 360/27; 360/28; 358/214; 358/327
[58] Field of Search ....................... 360/27, 28, 31, 65; 358/21 V, 315 327

[56] References Cited

U.S. PATENT DOCUMENTS 4,422,108 12/1983 Sampei et al. .......................... 360/65
4,700,239 10/1987 Yoshinaka et al. .................... 360/27

FOREIGN PATENT DOCUMENTS 61-46681 3/1986 Japan .

OTHER PUBLICATIONS

"The New Remote Control VIT Signal" by Bruce Longfellow, *Broadcast Engineering*, Dec. 1971.

Primary Examiner—Vincent P. Canney
Assistant Examiner—Kevin J. Fournier
Attorney, Agent, or Firm—Lowe, Price, LeBlanc, Becker & Shur

[57] ABSTRACT

A video signal recording and playback apparatus and method which is applicable to wide-band recording in which a video signal is divided into a plurality of channels by time-axis expansion, and the channels are recorded in parallel on respective tracks. Prior to recording, a reference signal consisting of a plurality of different signal bursts, each having a specific frequency and each being superimposed on a specific DC level, is inserted into blanking intervals of the video signal and recorded therewith. On playback, the amplitudes of the signal bursts in the reference signal are monitored, and playback equalizers are controlled accordingly such as to maintain a predetermined equalizer characteristic and to maintain identical overall frequency characteristics for the various channels.

6 Claims, 4 Drawing Sheets

METHOD AND APPARATUS FOR VIDEO SIGNAL RECORDING AND PLAYBACK SIGNAL LEVEL COMPENSATION BASED ON RECORDED REFERENCE SIGNAL

BACKGROUND OF THE INVENTION

The present invention relates to a method and apparatus for video signal recording and playback, and in particular to such a method and apparatus whereby a wide-band video signal is divided into a plurality of narrow-band video signals of respective channels, which are respectively recorded by FM recording, and whereby deterioration of the frequency characteristic of a playback signal due to differences between the FM transmission characteristics of the channels is automatically compensated.

The rotary 2-head helical scanning system, typical examples of which are the VHS and the Beta systems, is utilized as the basic operating system for large numbers of video tape recorders (abbreviated in the following to VTR). With such a VTR, electromagnetic heads are attached to the periphery of a rotary drum, spaced apart by 180°, whereby 2 fields (1 frame) of a video signal are recorded on two tracks of a magnetic tape during each revolution of the drum. One method of recording a wide-band video signal by utilizing a VTR of this type, i.e. designed for recording a standard TV signal, is to divide the wide-band vide signal into a plurality of narrow-band channels, and to record the divided video signals of these channels simultaneously in parallel. Specifically, assuming that the bandwidth of the wide-band video signal is n times that of the standard signal, the wide-band video signal is divided into n narrow-band video signals of n respective channels, which are recorded simultaneously on respective recording tracks. The following methods are possible for implementing this, in the case of division into two narrow-band video signal channels:

(1) To alternately allocate successive portions of the video signal to the channels each time a sampling point is reached;

(2) To alternately allocate successive horizontal scanning intervals (referred to in the following as 1H intervals) of the video signal to the two channels.

Method (2) above will be described in the following, taking as a practical example a VTR designed for 4 MHz bandwidth NTSC standard operation, with recording of a high-definition television signal employing the MUSE standard (8 MHz bandwidth) being performed by utilizing bandwidth compression. Table 1 shows a comparison between the NTSC and the MUSE standards.

TABLE 1

| Item | Standard | |
|---|---|---|
| | NTSC | MUSE |
| No. of horizontal scanning lines | 525 | 1125 |
| Horizontal scanning frequency | 15.75 | 33.75 kHz |
| Frame frequency | 60 | 60 Hz |

As can be understood from Table 1, each 1H interval of the MUSE standard video signal can be made substantially identical to a 1H interval of an NTSC standard signal, if the MUSE signal is subjected to time-axis expansion by a factor of 2. This is illustrated in FIG. 1.

Figure 1A:
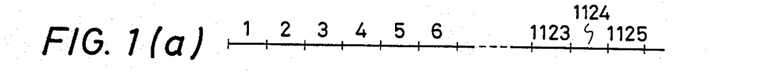
FIG. 1 is a diagram for assistance in describing a recording method employing time-axis expansion and 2-channel recording.
Figure 1B:
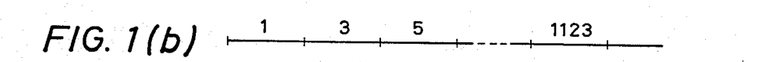
Figure 1C:
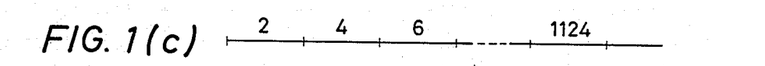

FIG. 1(a) shows horizontal scanning line numbers of a MUSE standard video signal while FIGS. 1(b) and 1(c) respectively show horizontal scanning line numbers of the MUSE signal after time-axis expansion of the horizontal scanning lines of FIG. 1(a) and division into two channels. By applying frequency modulation (FM) to the channel signals obtained in this way, and supplying the resultant FM video signals to respective ones of a pair of electromagnetic heads attached to the periphery of a rotary drum at mutually adjacent positions, one field of the video signal will be recorded simultaneously in parallel on two tracks of a magnetic tape. A second field of the video signal is then recorded, by a second pair of electromagnetic heads which are mounted on the rotary drum periphery at positions spaced apart from the first-mentioned pair by 180°.

During playback the original video signal is obtained by performing time-axis compression of the playback signals produced from the channel outputs of the respective heads, and combining the signals thus obtained. However when this is done, due to the fact that horizontal scanning lines which are mutually adjacent within a field of the video signal will be recorded through mutually different channels, deterioration of playback quality will occur due to the fact that there will inevitably be differences between the transmission characteristics of the channels.

A method of eliminating such differences between transmission characteristics which arise in an FM transmission system, i.e. differences in DC level, gain, and non-linearity, has been described in Japanese Patent Laid-open No. 61-46681. With that method, a reference signal such as a ramp signal is inserted into the blanking intervals of the video signal and is recorded together with the video signal. An algorithm is computed for performing compensation of the reference signal contained in the playback signal channels, i.e. after the video signal and reference signal have passed through the FM transmission system. This compensation is applied such as to restore the playback reference signal to a form which is close to that of the original reference signal. After performing compensation of the playback signals in accordance with this algorithm, the playback signals of the respective channels are combined. This method enables differences in DC level, gain and non-linearity between the channels to be eliminated.

However similar differences between the channels will occur in the frequency characteristics of the demodulated signals which are produced from such an FM transmission system, and these differences cannot be eliminated by the prior art method described above. The causes of frequency characteristic deterioration occurring in an FM transmission system are as follows. The generally utilized FM recording method is low-carrier FM. This is due to the fact that in VTR recording, the frequency of the modulation signal is higher, with respect to the FM carrier frequency, than in the case of other types of FM applications. This recording method is made possible by the properties of an FM signal, whereby it is feasible to utilize only one of the sidebands, i.e. the upper or the lower sideband. In addition, as is well known, the VTR recording and playback process results in boosting of low frequency components and attenuation of high frequency components of the recorded signal. Due to this, and since the noise characteristic is flat, if emphasis is applied to the high-frequency range by a playback equalizer and the upper and lower sidebands of the playback signal are of identical amplitude, then the level of noise in the upper sideband range of the playback signal will be relatively high. Thus, the S/N (signal/noise) ratio of the demodulated signal obtained from the playback signal will be poor.

In order to overcome this problem, VTRs generally employ a sloping shape of transmission characteristic. Specifically, the transmission characteristic (i.e. signal amplitude/frequency characteristic) of the overall FM system of a VTR, including the recording system, the heads, the tape, the playback system and the playback equalizer, has the form shown in FIG. 2. In this way, the transmission characteristic of a recording and playback system of a VTR result in emphasis of the low-frequency region and de-emphasis of the high-frequency region, as shown in FIG. 3(a). In FIG. 3(a), $B_{+1}$ and $B_{-1}$ denote respective rates of change of the upper and lower sidebands. Designating the carrier amplitude as $J_O$, that of the first upper sideband as $J_{+1}$, and that of the first lower sideband as $J_{-1}$, the following relationships are true:

$$B_{+1} = \frac{\text{Output}(J_{+1}/J_0)}{\text{Input}(J_{+1}/J_0)}$$

$$B_{-1} = \frac{\text{Output}(J_{-1}/J_0)}{\text{Input}(J_{-1}/J_0)}$$

Figure 3A:
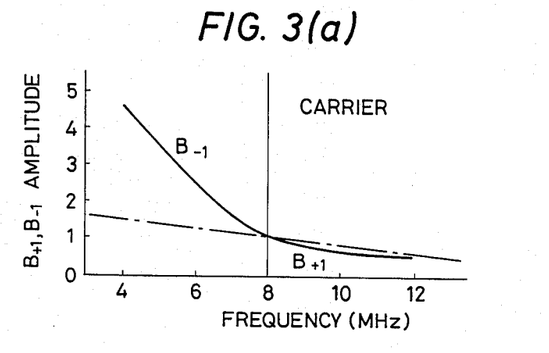
FIG. 3 shows sideband rate of change and equalizer characteristics for a generally utilized type of VTR.
Figure 3B:
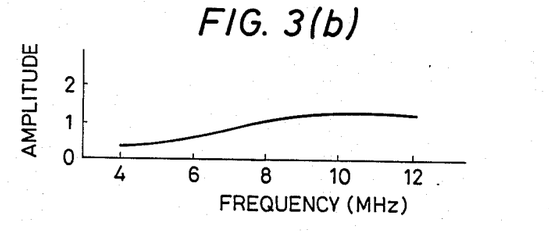

The playback equalizer has a transfer characteristic which is such as to execute correction for the $B_{-1}$ characteristic, and thereby produce an overall characteristic of the form shown by the chain line in FIG. 3(a). Such a playback equalizer characteristic is shown in FIG. 3(b). In this way, the amplitude/frequency characteristic of the demodulated FM signal can be made flat, without the need for applying emphasis to the upper sideband. A demodulated signal having a good S/N ratio can thereby be obtained.

Figure 2:
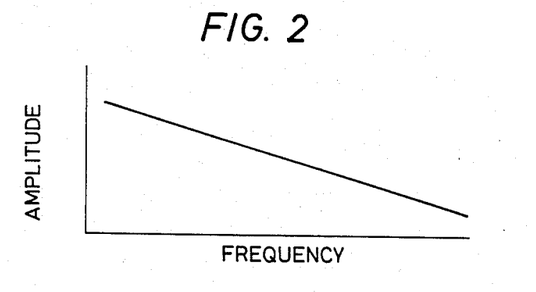
FIG. 2 shows a transmission characteristic of an RF signal of a generally utilized type of VTR.

With ideal FM transmission of this type, a transmission characteristic of the form shown in FIG. 2 can be initially established, as determined by the recording system, the heads, the tape, the playback system, and the playback equalizer. However in practice, the transmission characteristic of such a system will be different from that described, due to such reasons as differences in the recording and playback characteristics as time elapses, head wear, variations in the frequency characteristics of various types of tape, the temperature characteristics of analog circuits, etc. Furthermore, even initially, the problem of compatibility will arise, i.e. it will be necessary to perform playback of tapes which have been recorded on other units. This is another reason why a specific transmission characteristic cannot be established.

Furthermore with 2-channel recording as described above, horizontal scanning lines of the video signal which appear at mutually adjacent positions on the displayed image will be recorded through the different transmission systems of the respective channels. Differences in the frequency characteristics of these systems therefore result in conspicuous deterioration of image quality.

SUMMARY OF THE INVENTION

As described above, with a recording method whereby a video signal is divided into a plurality of channels, since the divided video signals are passed through different FM transmission systems, the video signals obtained after demodulation of playback signals will have respectively different frequency characteristics. This results in deterioration of image quality, i.e. when a displayed image is produced by combining these demodulated video signals. It is an objective of the present invention to provide a method and apparatus for video signal recording and playback which will overcome this problem. In order to attain the above objective, the present invention provides a method of video signal recording and playback, comprising steps of:

dividing a video signal which is to be recorded into a plurality of channels;

inserting a reference signal into blanking intervals of divided video signals of respective ones of the channels, and recording the divided video signals together with the reference signal on a recording medium, the reference signal comprising a combination of a plurality of respectively different signal bursts each being of a specific frequency and each being superimposed upon a DC level of specific value;

executing playback of the recording medium to obtain respectively frequency modulated playback signals of the channels, transferring the frequency modulated playback signals through respective playback equalizers, performing demodulation of the frequency modulated playback signals after transfer through the playback equalizers to obtain demodulated playback signals, extracting respective playback reference signals from the demodulated playback signals, and performing detection of respective amplitudes of the signal bursts in each of the playback reference signals, and;

executing control of the playback equalizers such as to render mutual relationships between the signal burst amplitudes of each of the playback reference signal substantially identical to mutual relationships between amplitudes of the signal bursts of the reference signal prior to recording on the medium.

The present invention further provides a video signal recording and playback apparatus, comprising:

means for generating a reference signal comprising a combination of a plurality of respectively different signal bursts each having a specific frequency and each being superimposed upon a DC level of specific value;

means for inserting the reference signal into a first video signal to produce a second video signal;

means for executing frequency modulation of the second video signal to produce a frequency modulated signal;

means for recording the frequency modulated signal upon a recording medium;

means for executing playback of the frequency modulated signal from the recording medium, to obtain a playback signal;

playback equalizer means for electrically varying a frequency characteristic of the playback signal;

means for executing frequency demodulation of the playback signal, to obtain a demodulated playback signal;

means for extracting the reference signal from the demodulated playback signal;

means for detecting respective amplitudes of the signal bursts in the reference signal following the extraction, to produce data which represents the amplitudes, and;

computation means coupled to receive the data, for performing predetermined computations on the data and for executing automatic control of a frequency characteristic of the playback equalizer means in accordance with results of the computations.

The method and apparatus of the present invention thereby enables automatic adjustment of the equalization characteristic of a playback equalizer, such as to bring the detected amplitudes of reference signal bursts specific frequencies in the reference signal, obtained from the demodulated FM playback signal, to specific amplitudes, Automatic compensation of channel frequency characteristics can thereby be achieved, for channel-divided recording operation.

DESCRIPTION OF THE PREFERRED EMBODIMENTS

An embodiment of the present invention will be described referring first to FIG. 4, in which numeral 1 denotes an input terminal to which is applied a video signal which is to be recorded. Numeral 2 denotes an A/D converter, numeral 3 a signal processing circuit (referred to in the following as a 2-channel divider circuit) which executes time-axis expansion of the input video signal and division of the video signal into two signal channels. Numeral 4 denotes a sync separator circuit for separating the sync components of the input video signal, and numeral 5 denotes a timing control circuit which produces a system clock signal, various timing signals, address signals, etc. During recording operation, timing control circuit 5 operates in accordance with a sync signal separated from the video signal which is being recorded, while during playback operation circuit 5 operates in accordance with a sync signal that is separated from the playback video signal. Numeral 6 denotes a reference signal generating circuit, which generates a reference signal, described hereinafter, at predetermined timings. Numerals 7 and 8 denote reference signal insertion circuits, which serve to insert the reference signal into each of the two channels of the divided video signal. Numerals 9 and 10 denote D/A converters, 11 and 12 denote FM modulators, 13 and 14 denote recording amplifiers, 15 and 16 denote recording heads, numeral 17 denotes a magnetic tape.

Numerals 18 and 19 denote playback heads, 20 and 21 denote playback amplifiers, 22 and 23 denote playback equalizers, 24 and 25 denote FM demodulators, 26 and 27 denote filter banks each containing a plurality of band-pass filters (BPFs). Numerals 28 and 29 denote detector circuits, 30 and 31 denote A/D converters, 32 denotes a playback signal sync separator circuit, 33 denotes a CPU input interface, 34 denotes a CPU (central processing unit) and 35 denotes an output interface. Numerals 36 and 37 denote A/D converters, 38 and 39 denote timebase error corrector circuits (abbreviated in the following to TBCs). Numerals 40 and 41 denote time-axis compression circuits, 42 denotes a 2-channel combiner circuit, 43 denotes a D/A converter, and 44 denotes a video signal output terminal. The operation of this embodiment is as follows.

The video signal which is to be recorded, for example a high-definition MUSE standard video signal, is applied to input terminal 1, and is converted to digital form by A/D converter 2. The resultant signal is subjected to time-axis expansion, i.e. with each horizontal scanning interval (1H interval) being time-expanded by a factor of 2, and is divided into 2 signal channels.

The sync components of the video signal applied to input terminal 1 are separated by recording signal sync separator circuit 4. Timing control circuit 5 generates a system clock signal by utilizing the separated sync signal from circuit 4 as a timing reference, and also produces timing signals for various signal processing functions. The reference signal generating circuit 6 operates under the control of timing control circuit 5 to produce a reference signal having the waveform shown in FIG. 5, in digital signal form, during reference signal insertion timing intervals, e.g. during one 1H interval in each vertical flyback interval. The reference signal generating circuit 6 can be readily implemented as a ROM (read-only memory).

Figure 5:
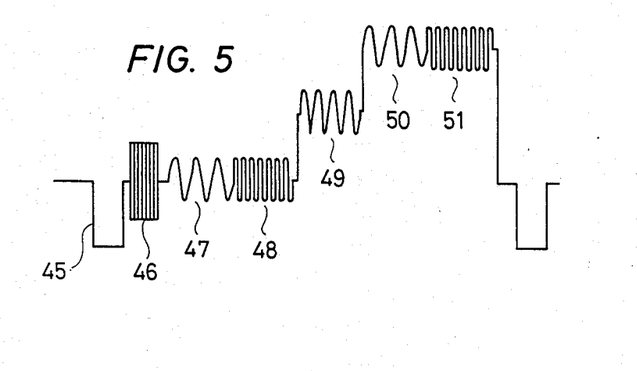
FIG. 5 is a waveform diagram of a reference signal in an embodiment of the present invention.

In FIG. 5, numeral 45 denotes a negative-polarity sync signal pulse, numeral 46 denotes a timing reference signal burst, while the reference signal is composed of a sequential combination of respectively different signal bursts 47 to 51, each having a specific fixed frequency and being superimposed upon a fixed DC level of specific value. In the present specification and claims, the term "respectively different signal bursts" as used with respect to the reference signal has the significance "signal bursts of respectively different frequency, or signal bursts superimposed on respectively different DC levels, or signal bursts which respectively differ both in frequency and in superimposed DC level". 47 denotes a signal burst whose frequency is intermediate between the highest and lowest frequencies of the video signal, and which will be referred to in the following as the first medium frequency. This signal burst is superimposed on a DC level corresponding to the black level of the video signal. Numeral 48 denotes a signal burst having a frequency which is in the uppermost region of the video signal frequency range, and will be referred to as the high frequency. Burst 48 is also superimposed on the black level of the video signal. Numeral 49 denotes a signal burst whose frequency is also intermediate between the highest and lowest frequencies of the video signal, but is higher than the first medium frequency, and which will be referred to as the second medium frequency. Burst 49 is superimposed on an intermediate DC level of the video signal. Numeral 50 denotes a signal burst at the first medium frequency, which is superimposed on a DC level corresponding to the white level of the video signal. Numeral 51 denotes a signal burst at the high frequency, which is also superimposed on the white level. The reference signal consisting of the combination of signal bursts shown in FIG. 5, i.e. the signal bursts 47 through 51 superimposed upon their respective DC levels, is inserted into a predetermined 1H interval within each vertical blanking interval of each of the two channel-divided time-axis expanded video signals, by the reference signal insertion circuits 7 and 8 respectively. The digital signals which are thereby produced from the insertion circuits 7 and 8 are then respectively converted to recording baseband signals by being transferred through D/A converters 9 and 10 respectively, and through low-pass filters (not shown in the drawings), to be then subjected to FM modulation in FM modulator circuits 11 and 12 respectively. The modulated signals produced thereby are applied through recording amplifiers 13 and 14 respectively and magnetic recording heads 15 and 16 respectively, to be recorded on magnetic tape 17.

Figure 6:
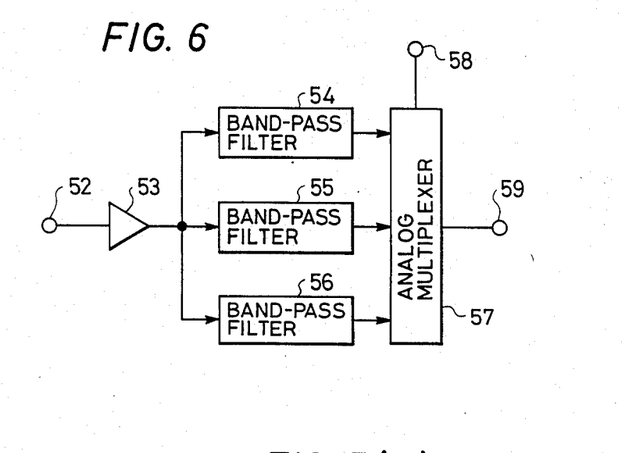
FIG. 6 is a circuit diagram showing a specific example of a filter bank utilized in the embodiment of FIG. 4.
Figure 7A:
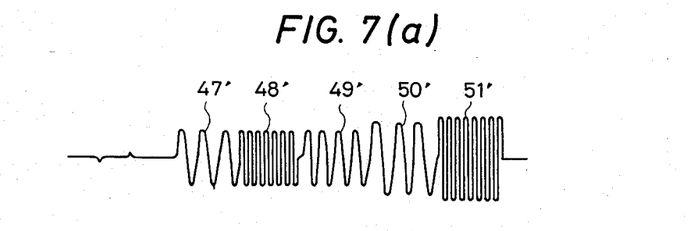
FIG. 7 is a waveform diagram of a playback reference signal waveform and a corresponding detection output waveform, for the embodiment of FIG. 7.

During playback operation, the playback signals which are produced from playback heads 18 and 19 respectively are amplified by playback amplifiers 20 and 21 respectively. The output signals from amplifiers 20 and 21 are transferred through playback equalizers 22 and 23 respectively to be supplied to FM demodulator circuits 24 and 25 respectively, whereby respective baseband signals are produced. These baseband signals are applied to the playback signal sync separator circuit 32, and sync signals thereby separated from the baseband signals are applied to control the operation of timing control circuit 5. During playback, output signals from timing control circuit 5 are applied to filter banks 26 and 27 to control the operation thereof, as described hereinafter. Ideally, the reference signal which is reproduced by playback operation should have the waveform shown in FIG. 5. However in practice, the S/N ratio, the frequency characteristic, etc of the playback reference signal will exhibit deterioration. The playback baseband signals are also applied to filter banks 26 and 27 respectively, each of which has the configuration shown in FIG. 6. In FIG. 6, numeral 52 denotes an input terminal, and 53 denotes a buffer amplifier. 54 denotes a narrow-band band-pass filter whose passband includes the frequency of signal bursts 47 and 50 (the first medium frequency) of the reference signal shown in FIG. 5, 55 denotes a narrow-band band-pass filter whose passband includes the frequency of signal burst 49 (the second medium frequency), and 56 denotes a narrow-band band-pass filter whose passband includes the frequency of signal bursts 48 and 51 (i.e. the high frequency). Numeral 57 denotes an analog multiplexer, 58 denotes a control terminal of multiplexer 57, and 59 denotes an output terminal. The playback reference signal is applied to input terminal 52, to be amplified by buffer amplifier 53, whose output signal is applied to each of filters 54, 55 and 56. Control signals are applied to control terminal 58 of multiplexer 57 from timing control circuit 5, (which operates during playback operation in accordance with a sync signal separated from the playback signal, as described above) whereby the outputs from filters 54 through 56 are respectively selected to be transferred to output terminal 59 at predetermined timings, i.e. at timings corresponding to those of signal bursts 47 to 51 in FIG. 5. FIG. 7(a) shows an example of the waveform of the signal which is thereby produced from output terminal 59.

Figure 7B:
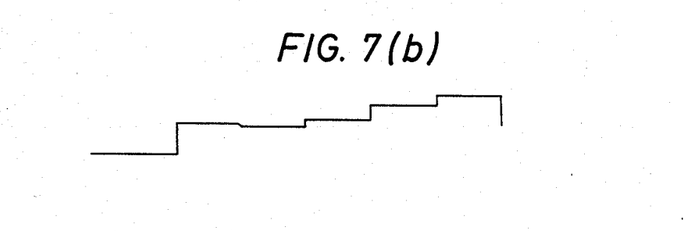

The output signals which are thereby obtained from filter banks 26 and 27 are respectively supplied to detector circuits 28 and 29. The resultant output signals from detection circuits 28 and 29 will be of the form shown in FIG. 7(b). The DC levels of each of these output signals from the detection circuits will vary in direct proportion to the amplitudes of the signal bursts in the playback reference signal (i.e. bursts 47' through 51' shown in FIG. 7(a)). The output signals thus produced from detector circuits 28 and 29 are supplied to A/D converters 30 and 31 respectively, to be converted to digital form, and are then read into the microprocessor 34, through the input interface 33. By utilizing the data thus read in, the microprocessor 34 performs correction of the equalizer characteristics of the playback equalizers 22 and 23, by means of signals which are applied through the output interface 35, i.e. microprocessor 34 controls the playback equalizers 22 and 23 in a manner such as to make the amplitudes of the signal bursts 47' to 51' shown in FIG. 7(a) become mutually identical.

After the frequency characteristics of the playback baseband signals have been corrected as described above, these signals are supplied to A/D converters 36 and 37 respectively, and the analog-converted baseband signals produced thereby are supplied to TBC circuits 38 and 39 respectively. Time axis errors in the baseband signals are thereby eliminated, and the resultant output signals from TBC circuits 38 and 39 are combined in a 2-channel combiner circuit 42, whose output is converted to a digital output video signal by the D/A converter 43. This output video signal is transferred to output terminal 44.

Figure 8:
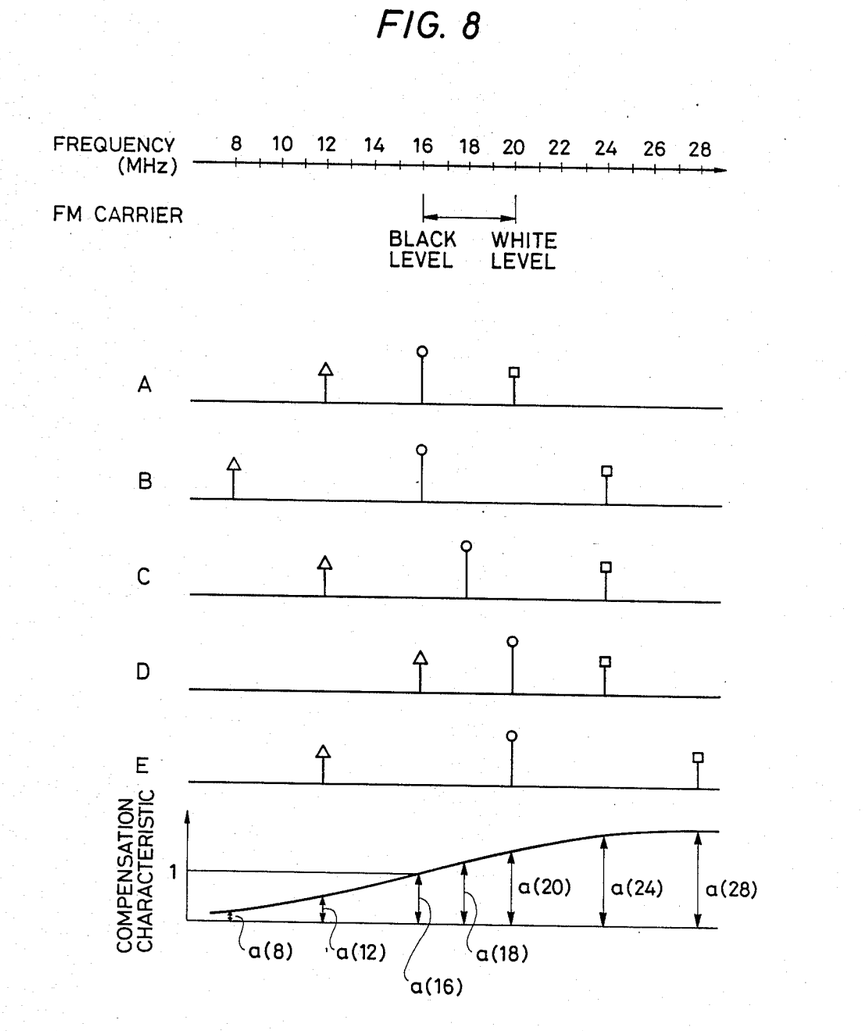
FIG. 8 is a diagram for assistance in describing carrier and sideband components of and FM-converted reference signal in the embodiment of FIG. 7.

The process of automatic adjustment of the playback equalizers, by utilizing data obtained from the playback reference signal is as follows. The spectrum of the recording reference signal shown in FIG. 5, after FM conversion, is shown in FIG. 8. In this example it is assumed that the FM carrier frequency is 16 MHz for the black level of the video signal and 20 MHz for the white level, and also that the high frequency signal bursts of the reference signal have a frequency of 8 MHz, while the first and second medium frequencies of the reference signal signal bursts (as defined with reference to FIG. 5 hereinabove) are 4 MHz and 6 MHz respectively. In this case, signal bursts 47, 48, 49, 50 and 51 of the reference signal shown in FIG. 5 will respectively correspond to A, B, C, D and E in FIG. 8. In FIG. 8, the "o" symbol denotes a carrier frequency, the "△" symbol denotes a lower sideband frequency, and the "□" symbol denotes an upper sideband frequency. As described hereinabove, it is desirable that the FM transmission system of the VTR (i.e. the overall system, including the recording amplifiers, the heads, the tape, the playback amplifiers, and the playback equalizers) has a frequency characteristic of the form shown in FIG. 2. The waveform shown in FIG. 7(a) is utilized to make the amplitudes of all of the signal bursts in the recording reference signal mutually identical.

The playback equalizer characteristic which is required to achieve this is shown in the graph at the lower part of FIG. 8, in which frequency is plotted along the horizontal axis, and amounts of equalizer compensation along the vertical axis. Amounts of equalizer compensation are indicated in the form a(f), where "f" denotes the frequency at which the compensation is applied (in MHz). Since the frequency characteristic of the input signals to the playback equalizers will change as a result of changes in transmission characteristics due to variations in the tape and the heads as time elapses, it is necessary for the compensation characteristic of each equalizer to change accordingly. Examples of specific values are given in Table 2 below.

TABLE 2

| Frequency (MHz) | Initial Playback Level | Equalizer Compensation | Equalizer Output Level | Playback Level After Change | Equalizer Output Level After Change |
|---|---|---|---|---|---|
| 8 | 5 | 0.3 | 1.5 | 6 | 1.8 |
| 12 | 3 | 0.43 | 1.3 | 4 | 1.72 |
| 16 | 1.5 | 0.73 | 1.1 | 2 | 1.46 |
| 18 | 1 | 1.00 | 1 | 1 | 1 |
| 20 | 0.8 | 1.13 | 0.9 | 0.6 | 0.68 |
| 24 | 0.4 | 1.75 | 0.7 | 0.3 | 0.53 |
| 29 | 0.3 | 1.67 | 0.5 | 0.2 | 0.33 |

Table 2 shows relative values for the initial playback signal level and for playback signal level after changes (e.g. due to component change as time elapses, as described above) have occurred in the equalizer characteristic, and the playback equalizer output levels before and after such changes in the playback level have occurred. If the playback equalizer output level follows a linear sloping characteristic, then the amplitude of for example signal burst 47' shown in FIG. 7(a), corresponding to spectrum A shown in FIG. 8, after FM conversion, is obtained as follows:

$$\text{Amplitude} = \frac{1}{2}\left(\frac{\rho_{-1}}{\rho_0} + \frac{\rho_{+1}}{\rho_0}\right) = \frac{1}{2}\left(\frac{1.3}{1.1} + \frac{0.9}{1.1}\right) = 1$$

The amplitudes of signal bursts 48' to 51' are also each made equal to 1, in a similar way. In the above equation, $\rho_0$ is the carrier amplitude, $\rho_{-1}$ is the amplitude of the primary lower sideband, and $\rho_{+1}$ is the amplitude of the primary upper sideband. If the transmission characteristic which is provided by the heads and the tape should change, such as to produce changes in the playback level and the equalizer output level at different frequencies, as shown in Table 2, then the amplitudes of signal bursts 47' to 51' are respectively obtained as follows:

$$47': \frac{1}{2}\frac{1.72}{1.46} + \frac{0.68}{1.46} = 0.82$$

$$48': \frac{1}{2}\frac{1.8}{1.46} + \frac{0.53}{1.46} = 0.80$$

$$49': \frac{1}{2}\frac{1.72}{1} + \frac{0.53}{1} = 1.12$$

$$50': \frac{1}{2}\frac{1.46}{0.68} + \frac{0.53}{0.68} = 1.46$$

$$51': \frac{1}{2}\frac{1.72}{0.68} + \frac{0.33}{0.68} = 1.51$$

Thus, the signal burst amplitudes are not made equal to 1, i.e. the frequency characteristic is not made flat. The equalizer characteristic must therefore be varied, by the amounts shown in Table 2 above, such as to make the amplitudes of each of the signal bursts 47' to 51' become equal to 1.

Figure 4:
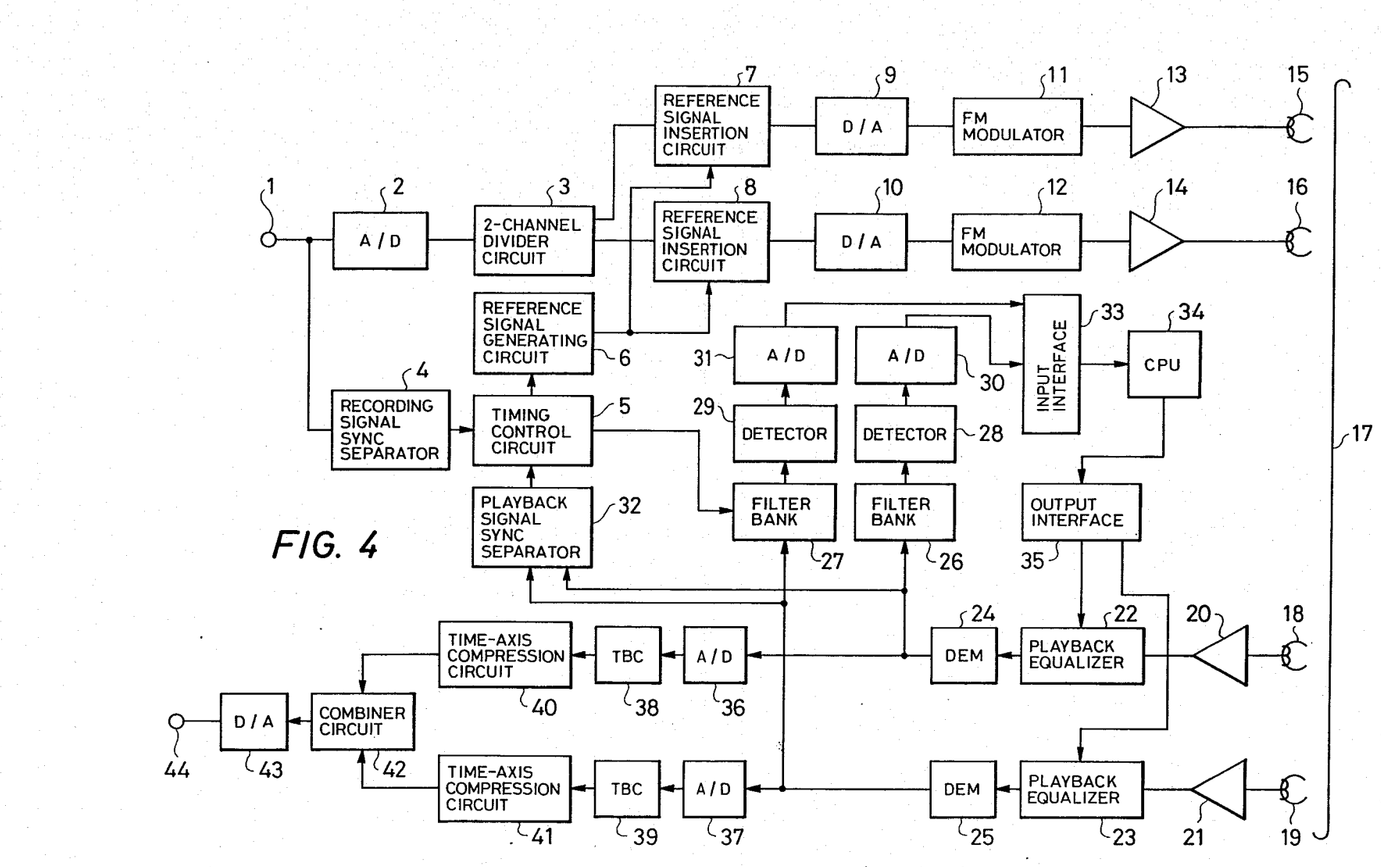
FIG. 4 is a block circuit diagram of an embodiment of a recording and playback apparatus according to the present invention.

Data representing the above signal burst amplitudes are applied through the input interface 33 shown in FIG. 4, and read into CPU 34. CPU 34 thereby executes control whereby the playback equalizer output level at 16 MHz is reduced, and the level at 20 MHz is increased, to make the amplitudes of each of signal bursts 47' and 51' approach a value of 1. Specifically, the amplitude of signal burst 47' is made equal to 1 by changing the playback equalizer output level at 16 MHz from 1.46 to 1.20. Similarly, in order to make signal burst 51' approach 1, the playback equalizer output level at 20 MHz must be changed from 0.68 to 1.03. As a result, the amplitudes of signal bursts 47' and 51' will each be made equal to 0.97. By successively repeating this control operation a number of times, all of the amplitudes of the signal bursts 47' to 51' can be brought close to a value of 1. The process described above can be expressed as:

(Playback signal level after change) ×

(Equalizer characteristic after change) =

(Equalizer output level before change)

By obtaining data for use in performing playback equalizer adjustment in this way, to execute compensation of the playback signal, the following advantages are obtained:

(1) Since closed-loop control is employed, reliable operation is attained.

(2) Only a small number of different filter frequencies are required for the filter banks, as compared with a system in which the playback equalizer output level is monitored directly.

Adjustment of the playback equalizers is performed utilizing data obtained from the playback reference signal through the process described above, whereby changes in the VTR frequency characteristic resulting from variations in the heads and tape, etc. as time elapses can be corrected, and whereby differences in frequency characteristics between the signal channels are eliminated. Enhanced playback quality is thereby attained.

The embodiment of the present invention described above relates to a VTR which employs multi-channel recording, by dividing a video signal between a plurality of channels. However the present invention is equally applicable to single-channel recording, and will provide similar advantages in such applications. In particular, in cases in which dubbing is repetitively performed, there is a possibility of deterioration of the frequency characteristic of the playback signal. This problem can be overcome by applying the method of the present invention described above to only a single channel.

As described in detail hereinabove, the present invention is highly applicable to FM recording in which a video signal is divided into a plurality of channels for recording and playback, since differences between the frequency characteristics of respectively playback video signal channel signals resulting from differences between the FM transmission characteristics of the channels can be automatically compensated.

The reference signal of the embodiment described hereinabove consists of a combination of a plurality of different types of signal bursts, each having a specific frequency and a specific DC level, with this combination of signal bursts being inserted within one horizontal scanning interval. However it would be equally possible to utilize a method whereby each signal burst (i.e. having a specific frequency and DC level) is continued for substantially the entirety of one horizontal scanning interval. In this case, the reference signal would consist of a plurality of horizontal scanning intervals of the video signal, containing respective signal bursts each of predetermined frequency and superimposed on a predetermined DC level, with the burst frequency and DC level being held constant during each horizontal scanning interval Such an arrangement has the advantage that greater accuracy of detection of the amplitudes of the signal bursts in the playback signal can be obtained, since each burst continues for a greater length of time. In such a case, the five different signal bursts of the embodiment described above would be respectively inserted into five different horizontal scanning intervals of the video signal.

What is claimed is:

1. A method of video signal recording and playback, comprising steps of:

inserting a reference signal into blanking intervals of a video signal which is to be recorded, and performing frequency modulation recording of said reference signal together with said video signal on a recording medium, said reference signal comprising a combination of a plurality of respectively different signal bursts each having a specific frequency and each being superimpose upon a DC level of specific value, with a plurality of said signal bursts of said reference signal being combined within one horizontal scanning interval of said video signal;

executing playback of said recording medium to obtain a frequency modulated playback signal, transferring said frequency modulated playback signal through a playback equalizer, performing demodulation of said frequency modulated playback signal after transfer through said playback equalizer to obtain a demodulated playback signal, extracting a playback reference signal from said demodulated playback signal, and performing detection of respective amplitudes of said signal bursts in said playback reference signal, and;

executing control of said playback equalizer such as to render mutual relationships between said signal burst amplitudes of said playback reference signal substantially identical to mutual relationships between amplitudes of said signal bursts of said reference signal prior to recording on said medium.

2. A method of video signal recording and playback, comprising steps of:

inserting a reference signal into blanking intervals of a video signal which is to be recorded, and performing frequency modulation recording of said reference signal together with said video signal on a recording medium, said reference signal comprising a combination of a plurality of respectively different signal bursts each having a specific frequency and each being superimposed upon a DC level of specific value, with respective ones of said signal bursts of said reference signal (are) being inserted into respective horizontal scanning intervals of said video signal, whereby said reference signal comprises a combination of different ones of said reference signal bursts contained in a plurality of said horizontal scanning intervals;

executing playback of said recording medium to obtain a frequency modulated playback signal, transferring said frequency modulated playback signal through a playback equalizer, performing demodulation of said frequency modulated playback signal after transfer through said playback equalizer to obtain a demodulated playback signal, extracting a playback reference signal from said demodulated playback signal, and performing detection of respective amplitudes of said signal bursts in said playback reference signal, and;

executing control of said playback equalizer such as to render mutual relationships between said signal burst amplitudes of said playback reference signal substantially identical to mutual relationships between amplitudes of said signal bursts of said reference signal prior to recording on said medium.

3. A video signal recording and playback apparatus, comprising:

means for generating a reference signal comprising a combination of a plurality of respectively different signal bursts each having a specific frequency and each being superimposed upon a DC level of specific value;

means for inserting said reference signal into a first video signal to produce a second video signal, with a plurality of said signal bursts being combined within one horizontal scanning interval of said second video signal;

means for executing frequency modulation of said second video signal to produce a frequency modulated signal;

means for recording said frequency modulated signal upon a recording medium;

means for executing playback of said frequency modulated signal from said recording medium, to obtain a playback signal;

playback equalizer means for electrically varying a frequency characteristic of said playback signal;

means for executing frequency demodulation of said playback signal, to obtain a demodulated playback signal;

means for extracting said reference signal from said demodulated playback signal;

means for detecting respective amplitudes of said signal bursts in said reference signal following said extraction, to produce data which represents said amplitudes, and;

computation means coupled to receive said data, for performing predetermined computations on said data and for executing automatic control of a frequency characteristic of said playback equalizer means in accordance with results of said computations.

4. A video signal recording and playback apparatus according to claim 3, and further comprising means for dividing said first video signal into a plurality of channel signals, and means for inserting said reference signal into each of said channel signals.

5. A video signal recording and playback apparatus, comprising:

means for generating a reference signal comprising a combination of a plurality of respectively different signal bursts each having a specific frequency and each being superimposed upon a DC level of specific value;

means for inserting said reference signal into a first video signal to produce a second video signal, with respective horizontal scanning intervals of said second video signal, whereby said reference signal comprises a combination of different ones of said reference signal bursts contained in a plurality of said horizontal scanning intervals;

means for executing frequency modulation of said second video signal to produce a frequency modulated signal;

means for recording said frequency modulated signal upon a recording medium;

means for executing playback of said frequency modulated signal from said recording medium, to obtain a playback signal;

playback equalizer means for electrically varying a frequency characteristic of said playback signal;

means for executing frequency demodulation of said playback signal, to obtain a demodulated playback signal;

means for extracting said reference signal from said demodulated playback signal;

means for detecting respective amplitudes of said signal bursts in said reference signal following said extraction, to produce data which represents said amplitudes, and;

computation means coupled to receive said data, for performing predetermined computations on said data and for executing automatic control of a frequency characteristic of said playback equalizer means in accordance with results of said computations.

6. A video signal recording and playback apparatus according to claim 5, and further comprising means for dividing said first video signal into a plurality of channel signals, and means for inserting said reference signal into each of said channel signals.

* * * * *